Oct. 27, 1953       J. P. MURDOCH ET AL       2,656,656
                    ARTICLE HANDLING MACHINE
Filed Jan. 7, 1949                            12 Sheets-Sheet 1
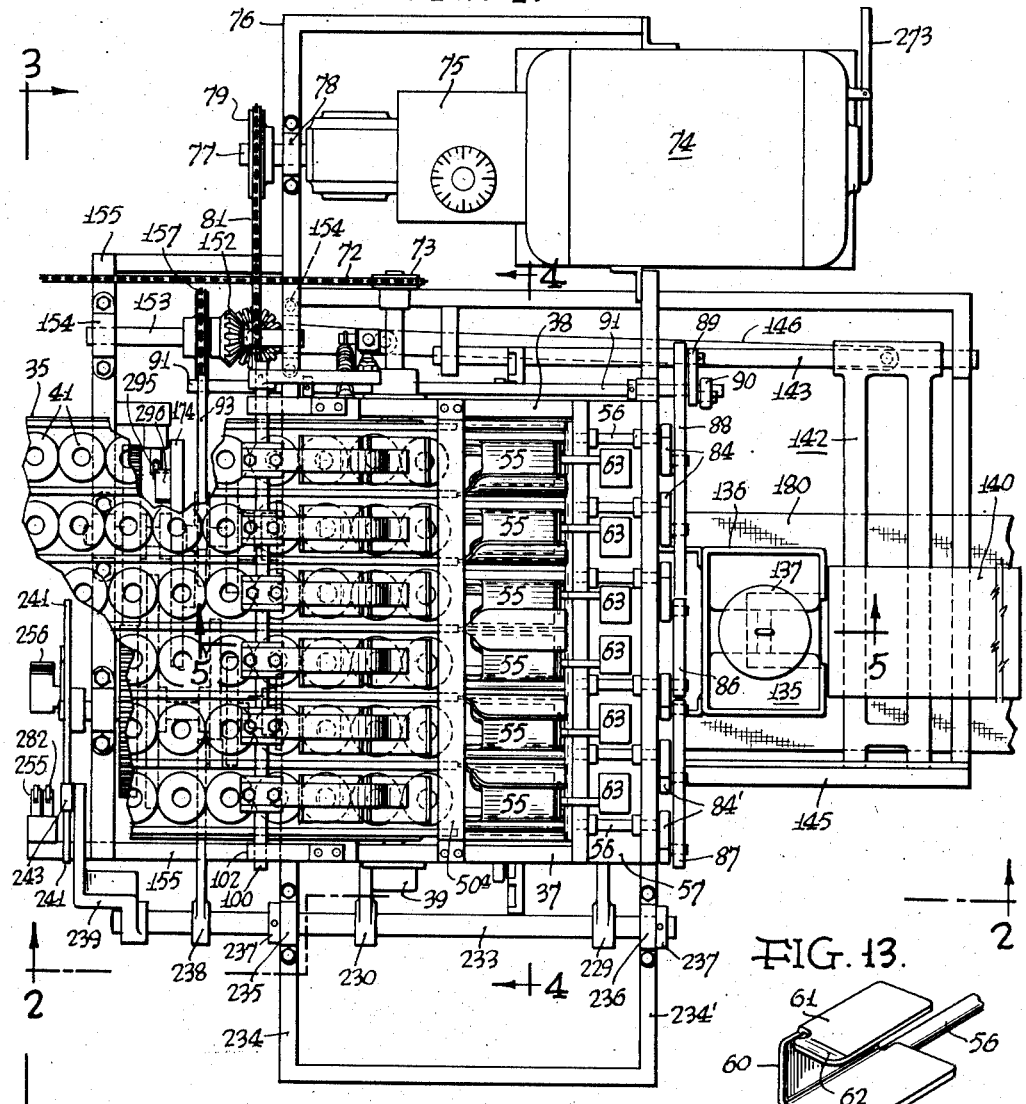
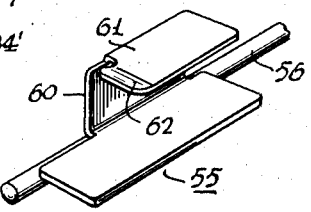
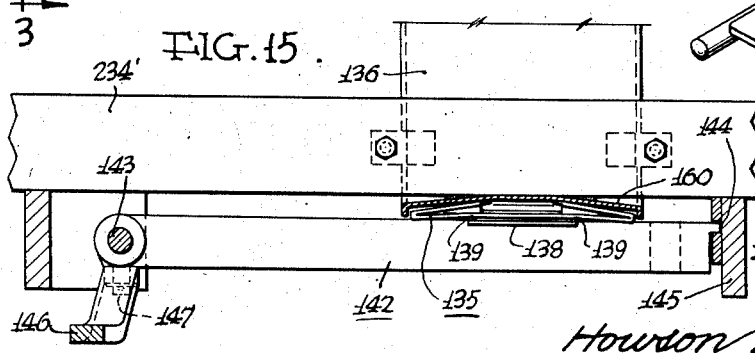
Inventors:
John P. Murdoch &
Albert J. Faulhaber
by their Attorneys
Howson & Howson

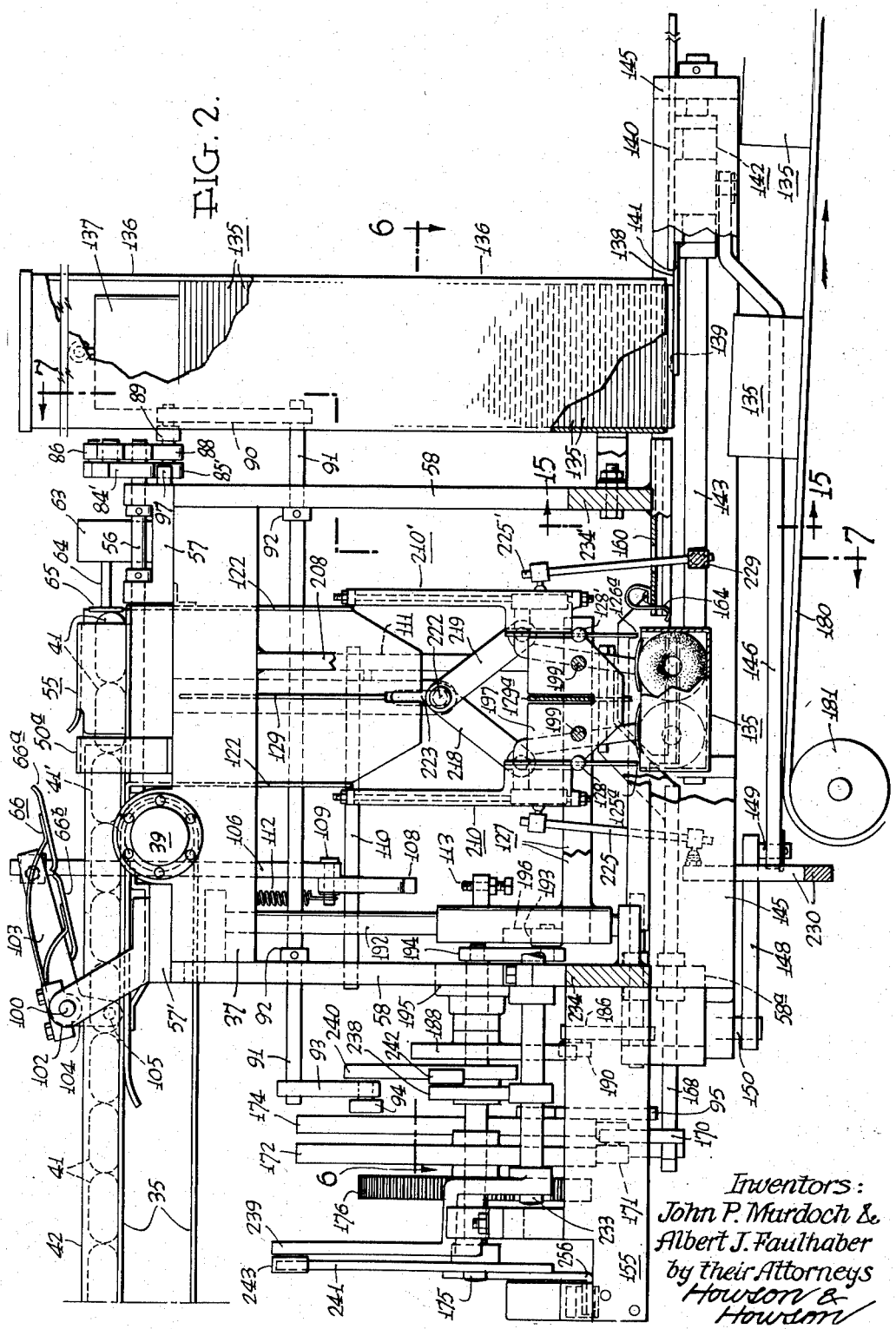

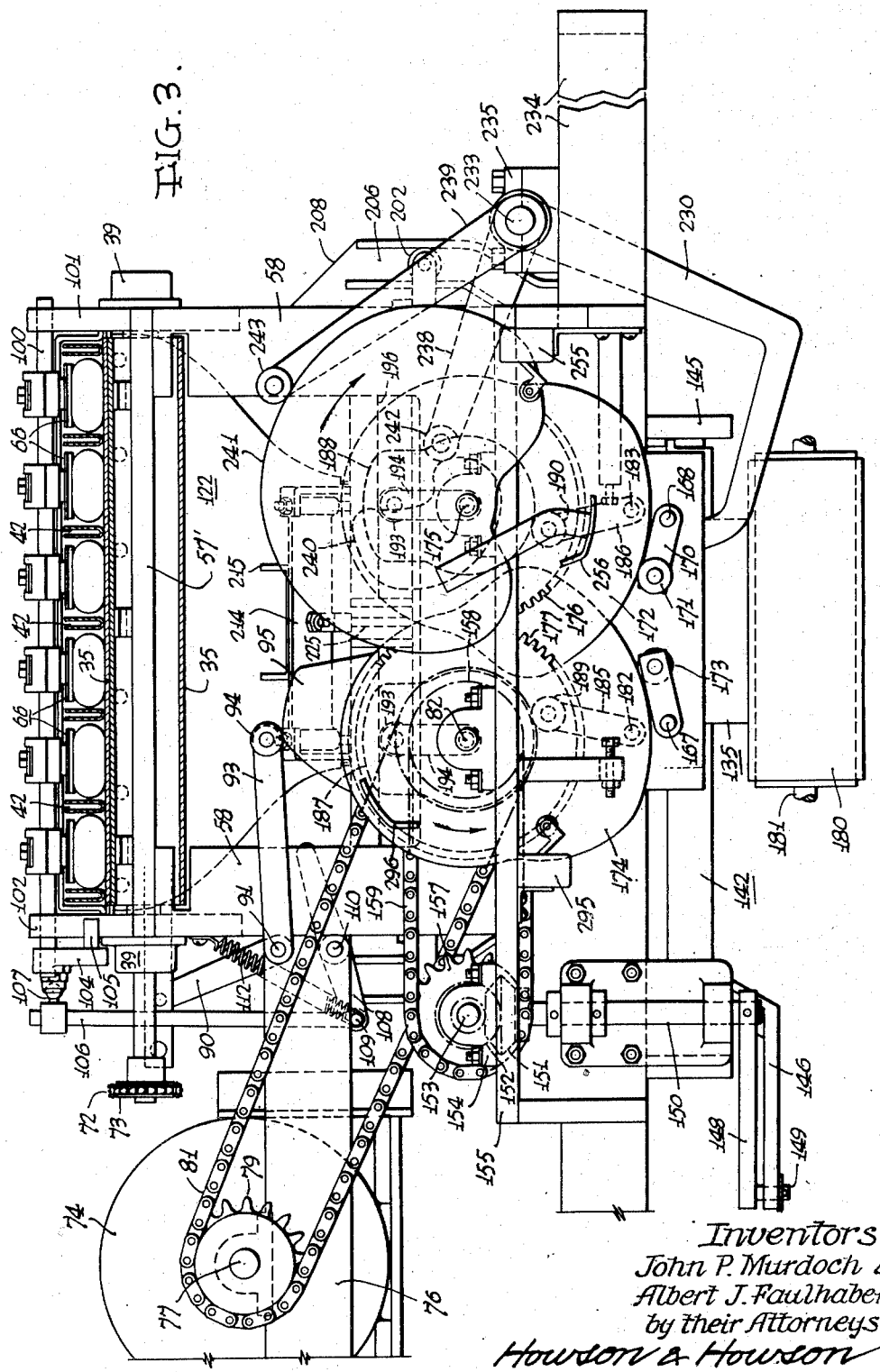

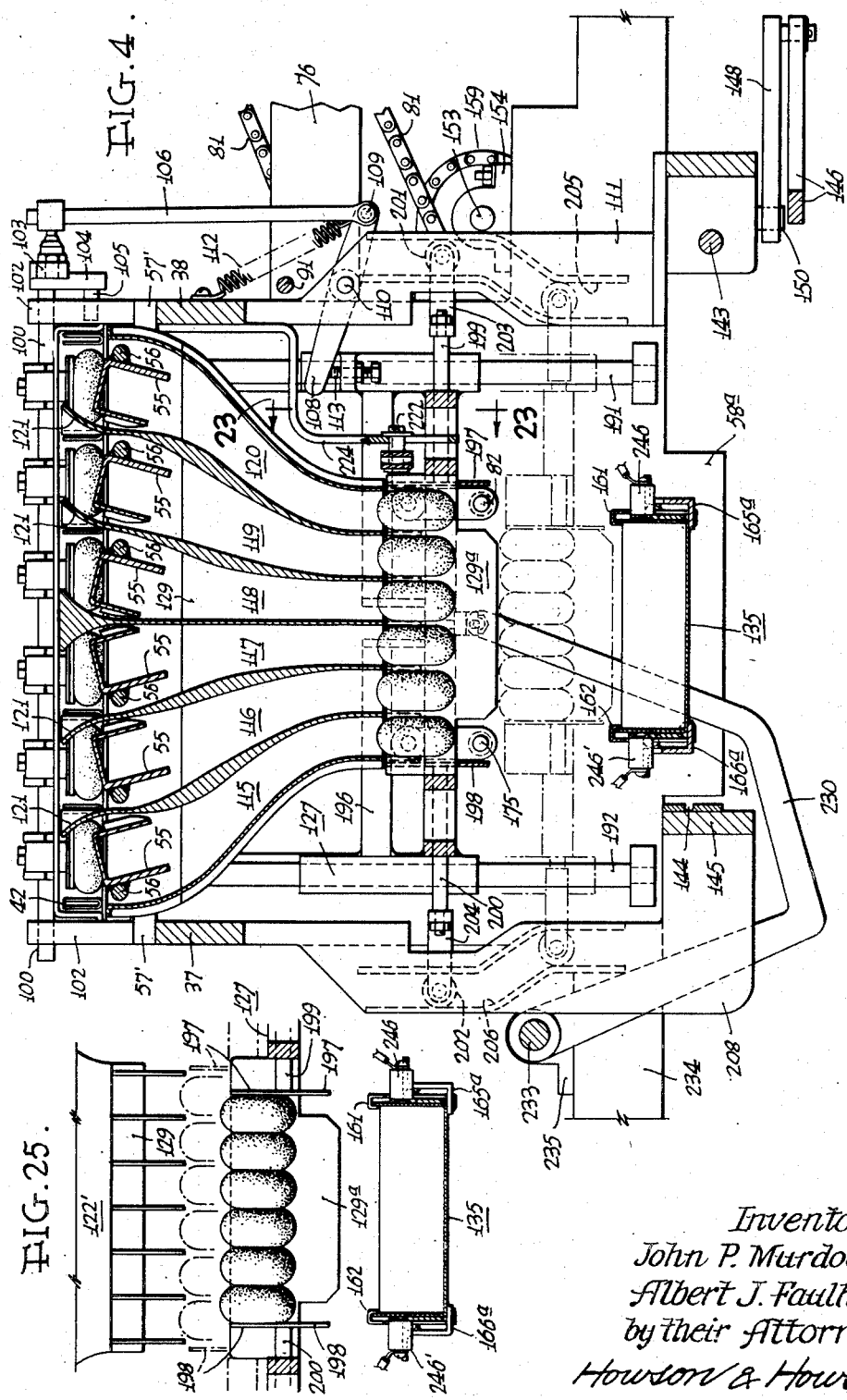

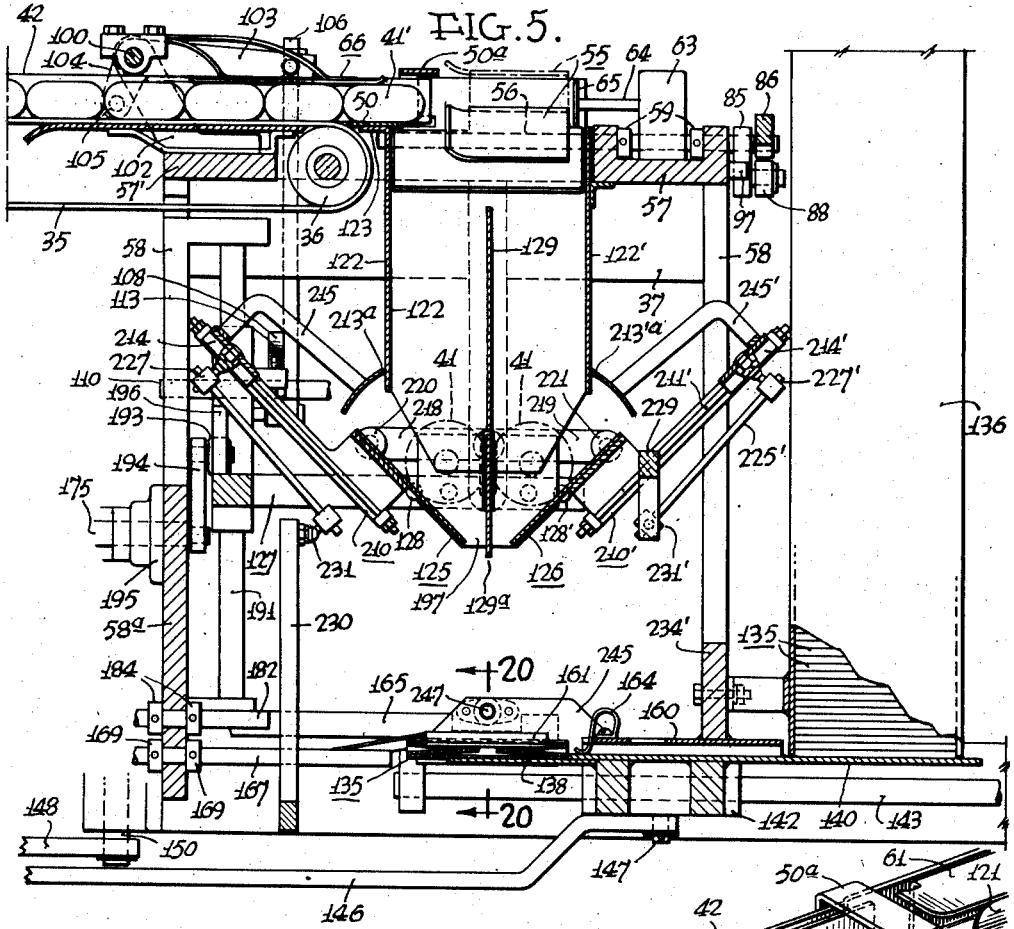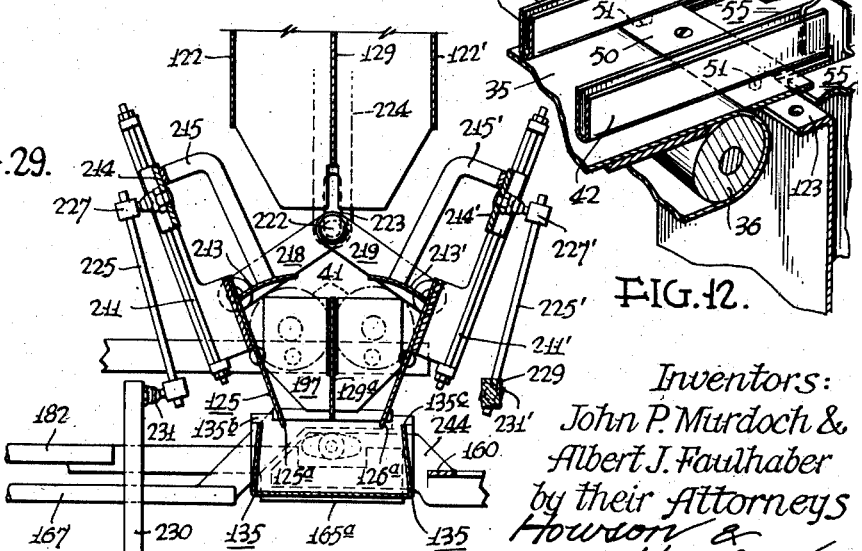

Oct. 27, 1953          J. P. MURDOCH ET AL          2,656,656
                    ARTICLE HANDLING MACHINE
Filed Jan. 7, 1949                              12 Sheets-Sheet 6

Inventors:
John P. Murdoch &
Albert J. Faulhaber
by their Attorneys
Howson & Howson

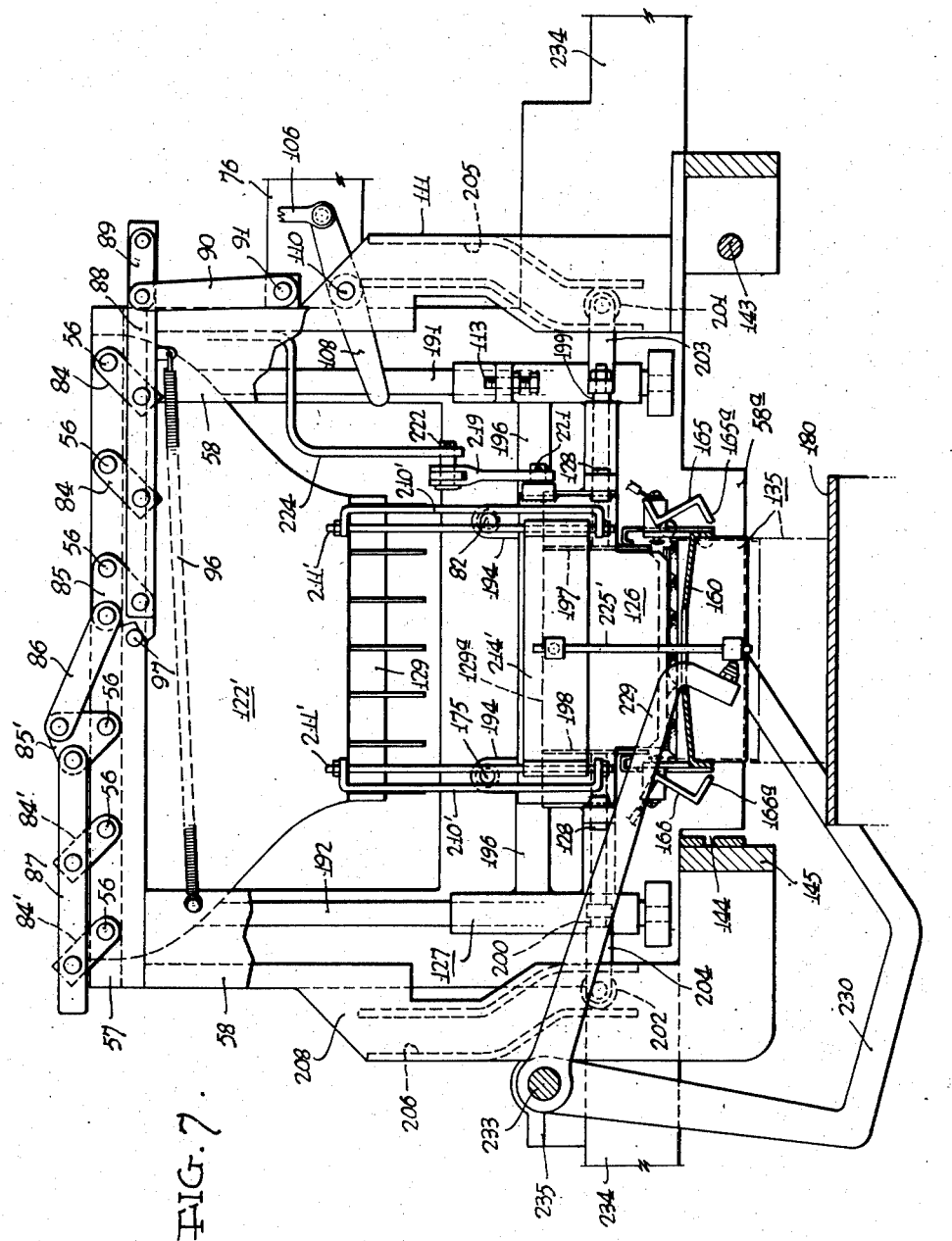

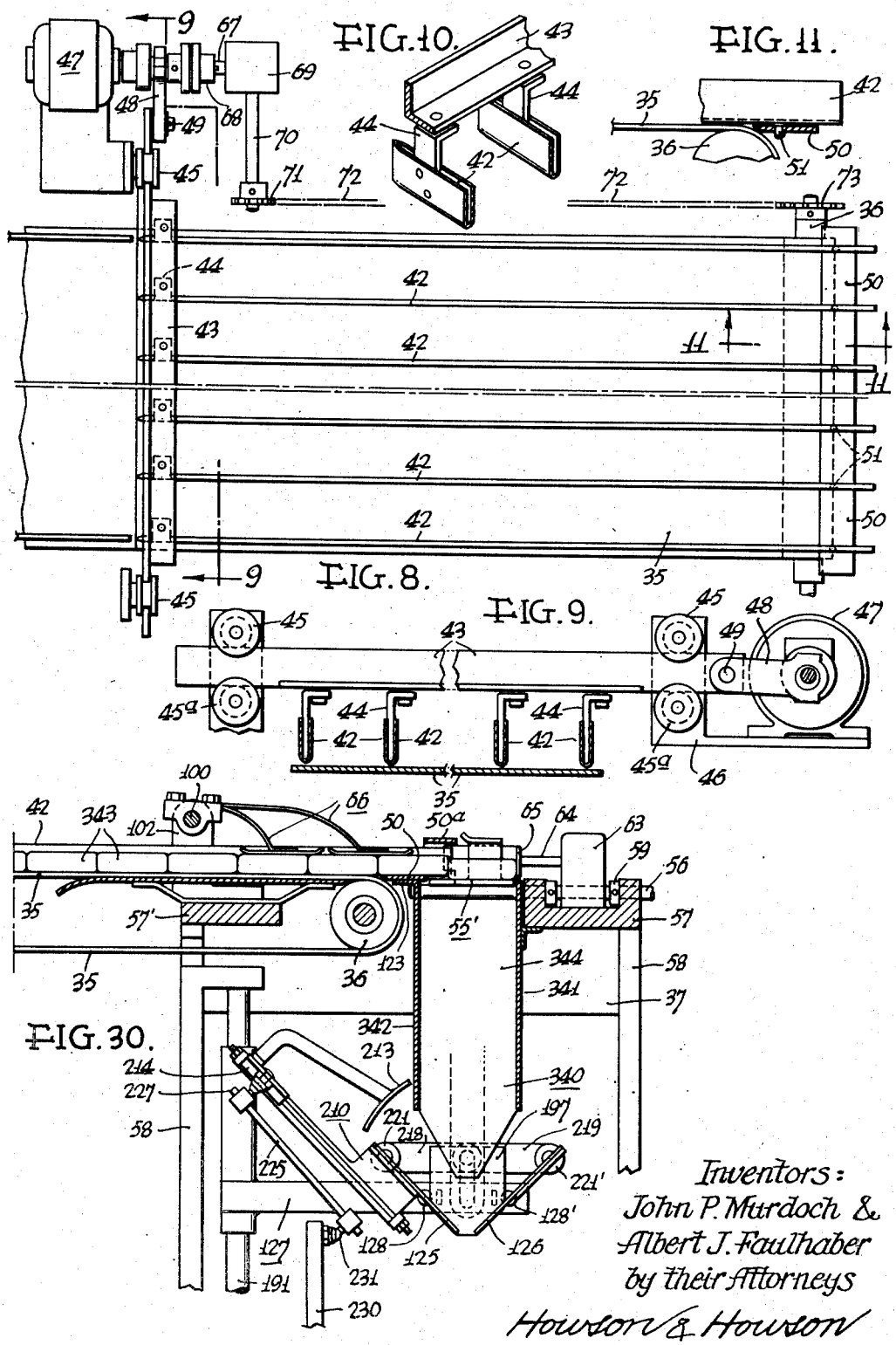

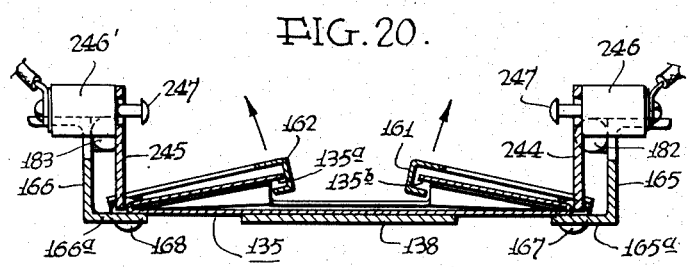
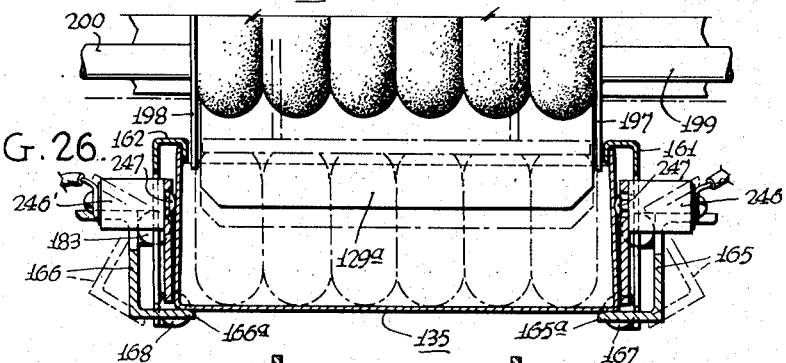
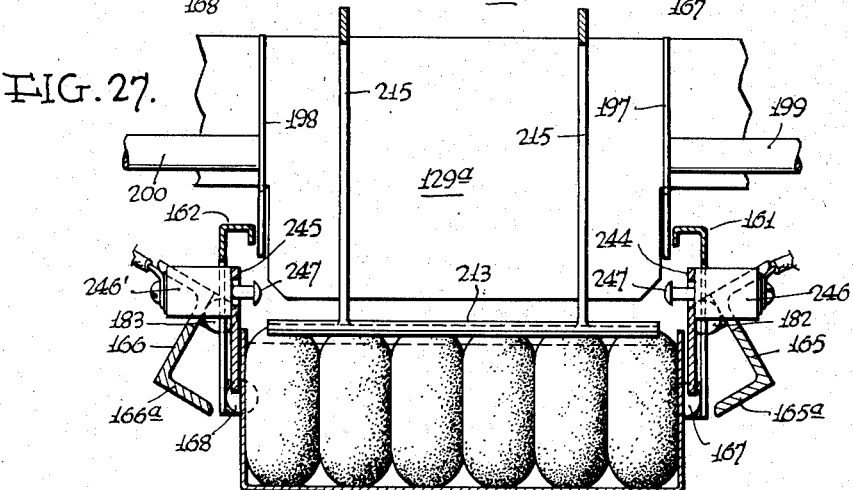
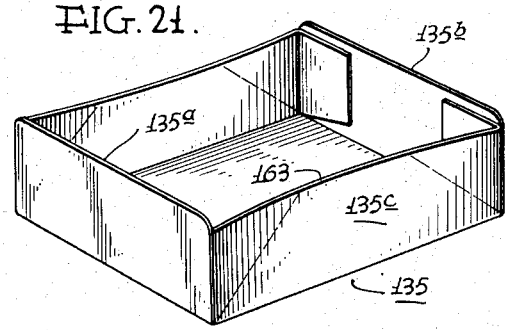
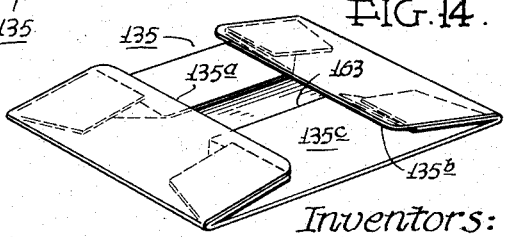

Oct. 27, 1953
J. P. MURDOCH ET AL
2,656,656
ARTICLE HANDLING MACHINE
Filed Jan. 7, 1949
12 Sheets-Sheet 10
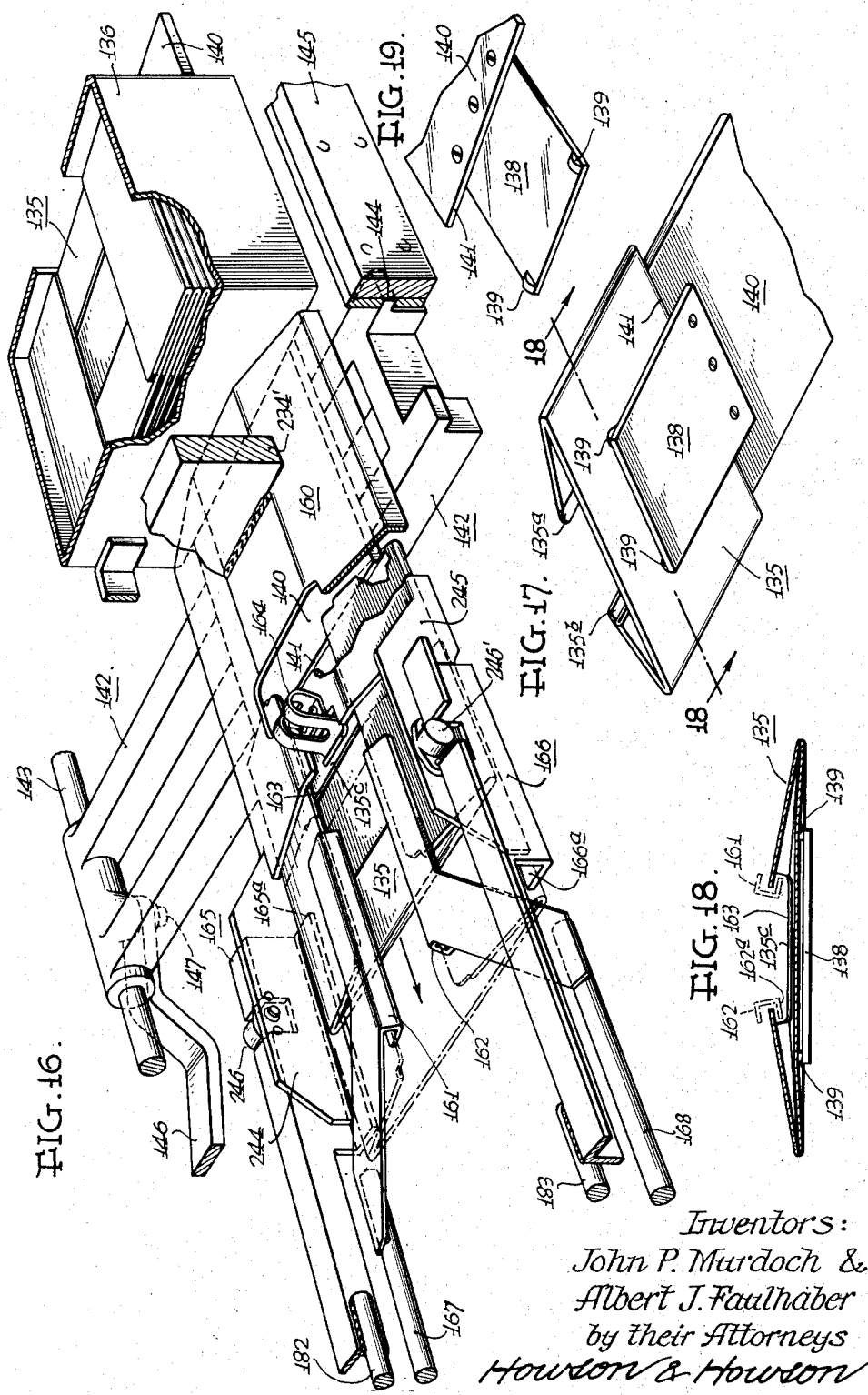
Inventors:
John P. Murdoch &
Albert J. Faulhaber
by their Attorneys
Howson & Howson

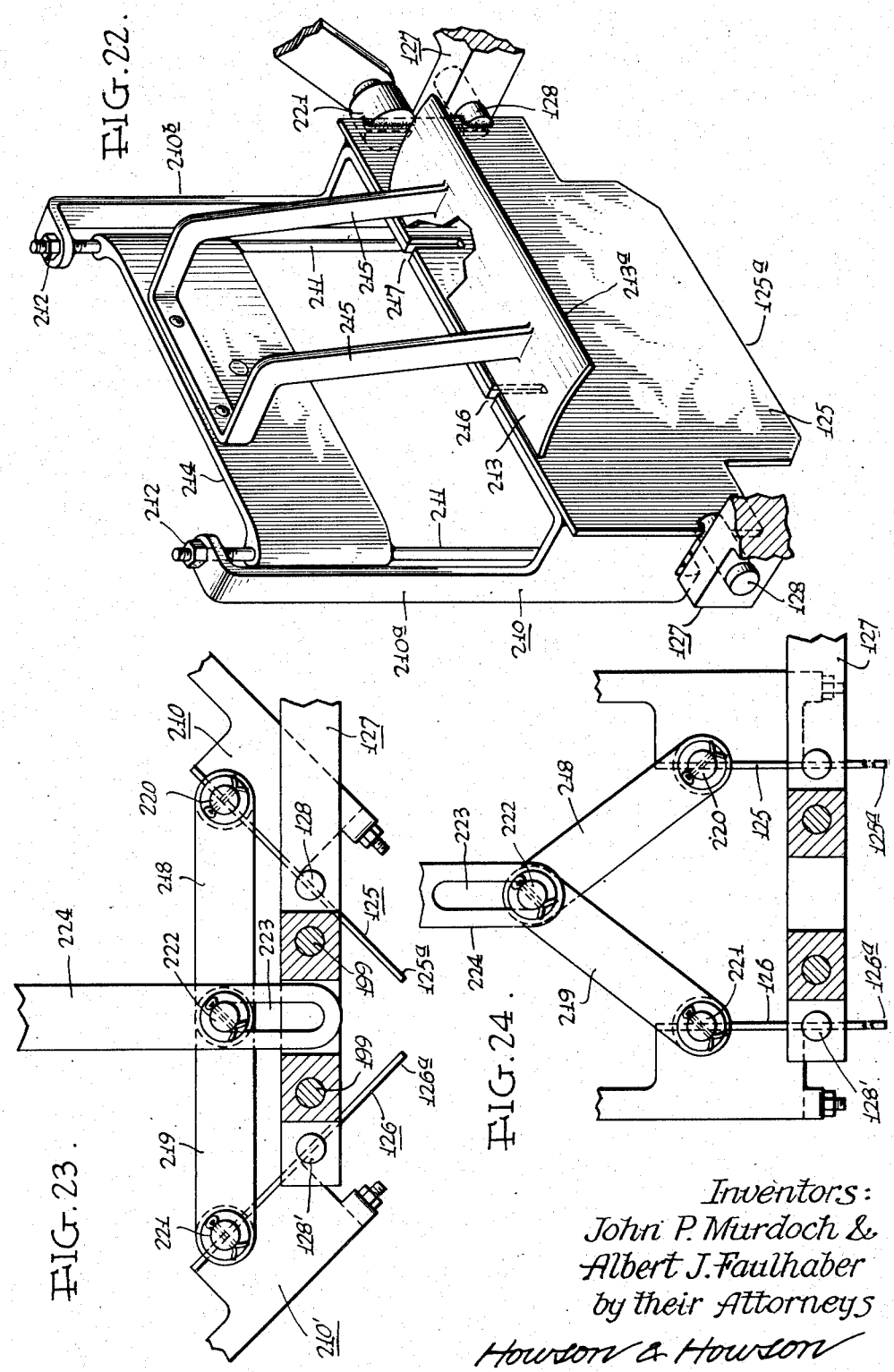

Oct. 27, 1953          J. P. MURDOCH ET AL            2,656,656
                        ARTICLE HANDLING MACHINE
Filed Jan. 7, 1949                                  12 Sheets-Sheet 12

Inventors:
John P. Murdoch &
Albert J. Faulhaber
by their Attorneys
Howson & Howson Patented Oct. 27, 1953

2,656,656

UNITED STATES PATENT OFFICE 2,656,656

ARTICLE HANDLING MACHINE

John P. Murdoch and Albert J. Faulhaber,
Ardmore, Pa.

Application January 7, 1949, Serial No. 69,714

14 Claims. (Cl. 53—35)

This invention relates to article handling machinery and more particularly to a machine designed to package objects in cartons.

The preferred embodiment of the invention is illustrated herein as applied to a machine for packaging twelve doughnuts in a cardboard carton which is automatically opened by the machine as the doughnuts are inserted therein. The doughnuts are fed to the machine on a conveyer which carries them in a horizontal or flat position, whereas they are packed in the carton in two rows of six each, on edge. The machine is characterized by electrical safety devices which serve to stop the machine automatically in the event that:

(a) less than twelve doughnuts are on the trap doors at a predetermined period in the cycle of operation;

(b) both sides of the carton are not opened;

(c) the means for removing the packed cartons from the machine becomes overloaded or clogged, so that the cartons would back up in the loading apparatus.

Further features of the machine relate devices for satisfactory handling and packaging of articles such as doughnuts which may vary considerably insofar as shape, size or weight are concerned. In this connection, it is important to note that the dimensions of the cartons are such that the doughnuts must be compressed transversely and longitudinally in order to fit in the carton. The packing mechanism is designed to accomplish this purpose with maximum efficiency and freedom from interrupted operation.

A primary object of the invention therefore, is to provide an article handling machine adapted to receive objects from a conveyer, to turn the objects 90°, and then to insert them into a suitably positioned container or carton.

A further object of the machine is to provide in an article handling device suitable for packaging, means for selecting a predetermined number of articles and transferring the predetermined number of articles to a station removed from the first station, and in retaining the remainder of the articles in position to be received by the transfer apparatus.

A further object of the invention is to provide in article handling apparatus, a trough which may be formed by a pair of guide plates adapted to receive articles deposited therein and to open a carton when the guide plates are pivoted about a horizontal axis.

A further object of the invention is to provide in article handling apparatus, means for injecting articles to be packaged into an unfolded carton, and means for compressing the articles to the inside dimensions of the carton as the articles are injected into the carton.

A further object of the invention is to provide a packaging machine for relatively soft objects which cannot withstand more than a limited amount of pressure or rough handling and which desirably are squeezed into a cardboard container so that there will be no relative motion between the doughnuts and the container when packed therein.

A further object of the invention is to provide in article handling apparatus, mechanism for feeding folded cartons to a station in position to receive articles to be inserted into the cartons when unfolded.

A further object of the invention is to provide in article handling apparatus, means for unfolding cardboard cartons in timed relation with means for filling said cartons.

A further object of the invention is to provide electrical limit switches positioned on the article tilting doors whereby the apparatus will be stopped in the event that the desired number of articles are not on each door.

A still further object of the invention is to provide electrical limit switches positioned on the carton unfolding mechanism whereby the apparatus will be stopped in the event that the carton is not completely unfolded.

A still further object of the invention is to provide electrical switches positioned on the means for removing filled cartons, whereby the apparatus will be stopped in the event the filled cartons back up beyond a predetermined station.

Further objects will be apparent from the specification and drawings in which:

Fig. 1 is a plan of an article handling machine constructed in accordance with the invention;

Fig. 2 is a side elevation on an enlarged scale, of the structure shown in Fig. 1, as seen at 2—2 of Fig. 1 but with the mechanism in a moved position;

Fig. 3 is a rear elevation on an enlarged scale, of the structure of Fig. 1 as seen at 3—3 of Fig. 1;

Fig. 4 is a vertical section on an enlarged scale as seen at 4—4 of Fig. 1;

Fig. 5 is a vertical section on enlarged scale, as seen at 5—5 of Fig. 1;

Fig. 7 is a front elevation of the machine partly sectioned, as seen at 7—7 of Fig. 2;

Fig. 8 is a fragmentary plan on a reduced scale, of the conveyer and vibrating mechanism;

Fig. 9 is a transverse section, as seen at 9—9 of Fig. 8;

Fig. 10 is a perspective detail showing the forward mounting of the vibrating walls;

Fig. 11 is a fragmentary sectional detail of the fixed mounting for one of the vibrating walls;

Fig. 12 is a fragmentary perspective of the inner terminus of the feed conveyer showing the vibrating wall and surrounding structure;

Fig. 13 is a perspective detail showing one of the tilting tables;

Fig. 14 is a perspective showing the folded carton;

Fig. 15 is an enlarged sectional detail of the carton magazine base and transfer arm, as seen at 15—15 of Fig. 2 but with the transfer carriage in a partially advanced position;

Fig. 16 is a perspective on an enlarged scale showing the carton magazine, transfer mechanism, and opening mechanism;

Fig. 17 is a perspective showing the bottom of the carton transfer member with a folded carton in position thereon;

Fig. 18 is a section as seen at 18—18 of Fig. 17;

Fig. 19 is a perspective of a portion of the top of the transfer mechanism shown in Fig. 17, but with the carton removed;

Fig. 20 is a sectional detail on an enlarged scale as seen at 20—20 of Fig. 5;

Fig. 21 is a perspective showing the carton of Fig. 14 in an unfolded or open position;

Fig. 22 is an enlarged perspective detail showing one of the guide plates and pushers, together with their supporting structure;

Fig. 23 is an enlarged fragmentary detail as seen at 23—23 of Fig. 4, showing the guide plates and the operating linkage therefor in position to receive a batch of doughnuts;

Fig. 24 is a view similar to Fig. 23 but with the mechanism in the position in which the doughnuts are ejected from the guide plates into the carton, as seen at 24—24 of Fig. 7;

Fig. 25 is a fragmentary detail showing the mechanism in a moved position from that of Fig. 4;

Figs. 26 and 27 are views similar to Fig. 25 but on an enlarged scale and showing successive moved positions of the filling and ejecting mechanism;

Fig. 29 is a view similar to Fig. 28 with the apparatus moved still farther;

Fig. 30 is a fragmentary view similar to Fig. 5 of a modified form of machine;

Fig. 31 is a wiring diagram for the electrical control system; and

Fig. 32 is a schematic view of the discharge conveyer and the electrical switches for stopping the machine in the event that the cartons are not removed as fast as they are packed.

Figure 6:
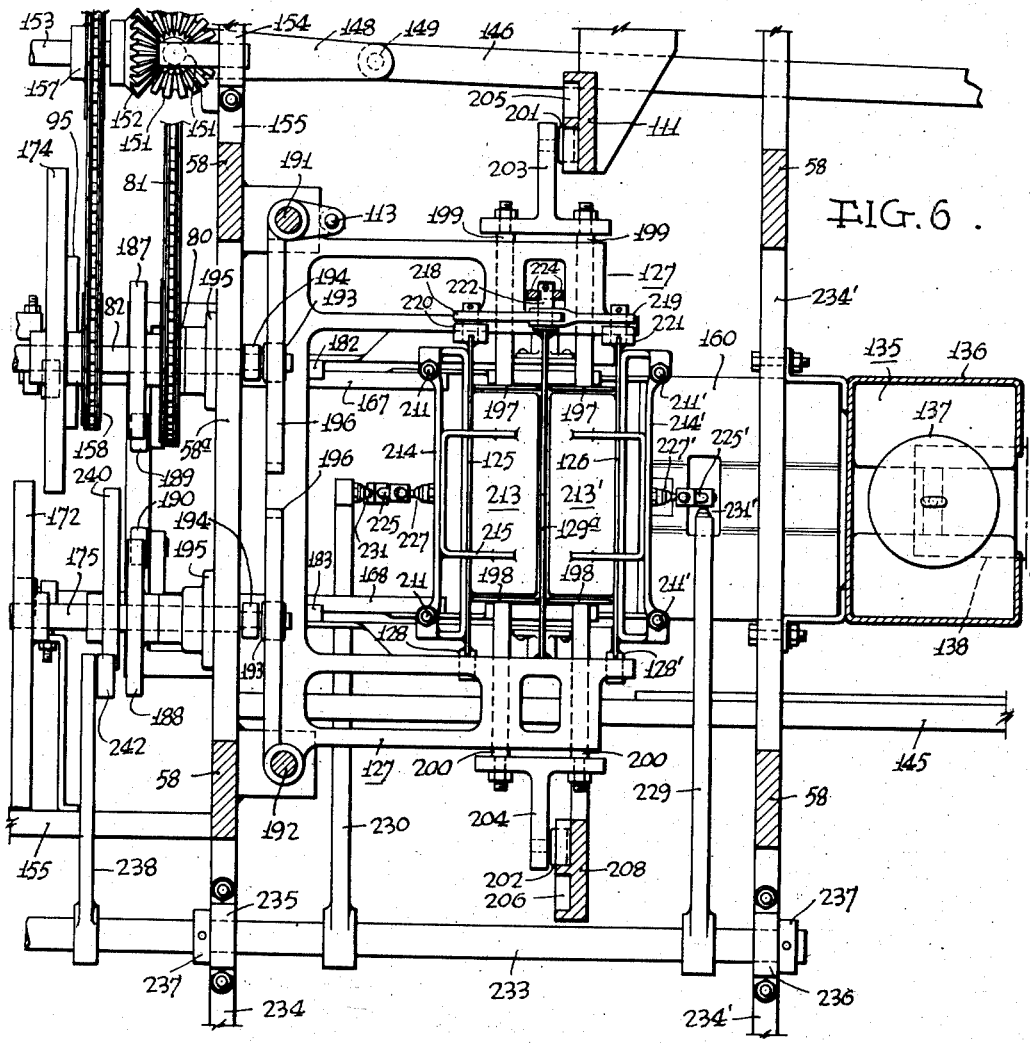
Fig. 6 is a horizontal section as seen at 6—6 of Fig. 2.

The preferred embodiment of the present invention comprises an upper conveyer belt which feeds the doughnuts or other objects to be packaged into six, or any desired number of, longitudinal channels formed over the surface of the belt by means of seven metallic walls which are mounted at their forward ends to vibrate rapidly to prevent jamming of the doughnuts between the walls and to facilitate movement of the doughnuts onto the machine proper.

A tilting platform or trap door long enough to accommodate two doughnuts thereon is positioned at the termini of each channel formed by the vibrating walls. Each trap door is provided with one sidewall and a top which assist in preventing the doughnuts from becoming jammed, and also in preventing the doughnuts from tilting or jumping up in any way. When two doughnuts are properly positioned on each door, a trigger switch positioned at the back of the door is engaged by the forward doughnut so that when all six trigger switches have been depressed, there must be twelve doughnuts on the various doors. Immediately preceding the doors, there is stationed a hold-down or clamp in each channel that is intended to retain succeeding third doughnuts in each channel from interfering with the free operation of the tilting tables. The hold-down clamps are actuated in timed relation to the mechanism so that clamping action occurs only at the time the doors are opened and does not interfere with the desired forward movement of the doughnuts in the channels.

At this point in the cycle of operation, a "pulsing" or testing switch closes a circuit which is connected to each of the trigger switches for the individual trap doors. In the event that every trigger switch is not closed, the machine will stop automatically in a manner to be described more fully hereinafter. When all the trigger switches are closed by the pair of doughnuts on each trap door, the doors are opened by pivoting along a longitudinal axis to dump the twelve doughnuts into six chutes separated by a partition to provide twelve passages which serve to position the doughnuts on end in two rows of six, side by side. While the twelve doughnuts are thus being selected in this manner, a folded cardboard box or carton has been advanced from the bottom of a magazine into a position in vertical registry with the twelve doughnuts. A pair of box openers unfold the boxes, whereupon the plates on which the doughnuts are resting are lowered and pivoted on a horizontal axis to open the opposite walls of the carton and to compress the doughnuts edgewise against each other. Suitable action of the mechanism serves to compress the rows of doughnuts endwise and to move them along the plates into the carton. The filled carton is discharged onto any suitable means for removing it, such as a conveyer belt, and the box openers and their associated mechanism are retracted to repeat the cycle.

In the event that the folded carton is not properly opened, the machine is stopped by means of a pair of trigger switches similar to those described above but which are actuated by the sides of the carton as they are unfolded. In a similar manner, suitable stations on the carton conveyer may be located to stop the machine in the event that the cartons are not removed from the conveyer fast enough.

Referring now more particularly to the drawings, the feeding mechanism of the machine comprises an endless conveyer belt 35 mounted on forward roll 36 which is in turn journaled in the frame members 37 and 38 by bearings 39 and 40 respectively. The conveyer belt 35 is sufficiently wide to accommodate six rows of articles to be packaged, which in the present instance may be doughnuts 41. The doughnuts are guided into six rows by means of a plurality of vertical, longitudinally extending walls 42, 42 (Figs. 8–11) which are pointed at their forward ends and secured to a cross bar 43 by means of brackets 44, as shown in Fig. 10. Cross bar 43 is supported at each end by a pair of rollers 45, 45 and 45a, 45a mounted on vertical bracket 46. The cross bar 43, together with the walls 42, 42 may be vibrated rapidly from side to side by means of a suitable electric motor 47 which drives a pitman arm 48 connected to the cross bar 43 by pin 49. The walls 42 are formed of thin sheet metal and bent in a U-shaped configuration as shown in Figs. 9 and 10. The opposite ends of the walls 42 are rigidly attached to lower cross plate 50 by means of pins or rivets 51 (Figs 11 and 12).

As will be seen from Figs. 11 and 12, plate 50 is provided with a forward pointed edge adapted to receive and separate all doughnuts from the conveyer belt 35. We have found that the vibrating walls are important in preventing doughnuts from becoming jammed in the channels, a condition that may occur in the event that several doughnuts of relatively small diameter enter one of the channels successively. Roof 50a (Figs. 5 and 12) comprises a flat, transverse member positioned substantially midway between feet 66 and the trap doors 55, to be described more fully hereinafter. Should the third doughnut 41' be slightly farther advanced than is shown in Fig. 5, the roof 50a will prevent excessive tilting of the doughnut when pressed by the foot 66. Thus, continuity of feed is assured.

In alignment with each channel and on the opposite side of the plate 50, there is a tilting table or trap door 55 which is pivotally actuated by means of shaft 56 journaled in U-shaped frame member 57, supported on one vertical frame member 58 and members 37, 37, and retained axially therein by means of collars 59, 59. Each trap door has one lateral wall 60 which in turn supports a top or cap portion 61 which is flared upwardly at 62 to facilitate receiving the doughnuts from conveyer belt 35. It will be understood that the construction of the various trap doors 55 is identical except that they may be designed to tilt in opposite directions, as shown clearly in Fig. 4.

Each trap door 55 has associated therewith a limit or trigger switch 63 having an actuating arm 64 and plate 65 attached thereto in such a manner that when a pair of doughnuts 41 is properly positioned on trap door 55, plate 65 of switch 63 acts as a forward wall for the doughnuts and prevents them from moving farther forward on the trap door.

When all six trap doors 55, 55 have been loaded with two doughnuts so that their associated switches 63, 63 have been opened, a clamping foot 66 which may if desired, have two sections 66a and 66b is pivoted to lightly retain the third doughnut 41' on plate 50 in each channel. In this way, any possibility that three doughnuts could become positioned on trap doors 55 or any possibility that the third doughnut could become wedged in the door or the cover 61, is avoided.

The conveyer 35 is driven by motor 47 through shaft 67, electrically controlled clutch 68, gear box 69 which may be of the speed reduction variety, shaft 70, sprocket 71, chain 72, and sprocket 73 mounted on the forward conveyer roll 36.

The remainder of the movable mechanism is driven from main motor 74 which is provided with a variable speed reduction unit 75. Motor 74 and variable speed reduction unit 75 are mounted on frame member 76. Shaft 77 from the motor is journaled on the frame at 78 and carries a sprocket 79 which drives sprocket 80 through chain 81. Sprocket 80 is mounted on shaft 82 which also carries the cams and actuating devices for the trap doors 55 (Figs. 3 and 6).

The trap door shafts 56, 56 are provided with a plurality of cranks 84, 84' and 85, 85' (Fig. 7). Cranks 84, 84, 85 are connected to shafts 56 in such a manner that they depend below the centers of their associated shafts, whereas cranks 84', 84', 85' are connected in such a way that they extend above the centers of the other three shafts. Cranks 85 and 85' are rigidly secured to the two inner shafts and are pivotally connected to each other by means of a tie link 86. Cranks 84', 84' and 85' are also pivotally connected by means of a tie link 87, whereas cranks 84, 84 and 85 are pivotally connected by means of a tie link 88 which is extended to pivotally receive a short link 89. It will be apparent from Fig. 7 that when link 88 is displaced horizontally as seen in the figure, the various shafts 56 are rotated to tilt their associated trap doors 55, thus permitting the doughnuts to fall from the doors. Three trap doors will tilt in one direction, whereas the other three trap doors will tilt in the opposite direction due to the angular position in which the cranks are attached to their associated shafts.

Actuation of links 87 and 88 is achieved by means of a bell crank 90 pivotally connected to link 89 and rigidly attached to shaft 91 which is journaled in frame members 58, 58 and retained axially therein by means of collars 92, 92 (Fig. 2). The end of shaft 91 opposite crank 90 is provided with an arm 93 and a cam follower 94 adapted to make intermittent contact with cam 95 fixed to shaft 82. The trap doors and their associated linkages are normally retained in the flat or closed position shown in Fig. 2, by means of helical extension spring 96 (Fig. 7) which urges crank 85 against the limit stop 97. The cam follower 94 does not engage cam 95 except when the lift portion of the cam rotates in a position to contact cam follower 94.

The clamping feet 66, 66 are mounted on a transverse shaft 100 (Fig. 3) which is journaled in brackets 101 and 102 mounted on plate 57' which is in turn supported on frame members 37, 38, and 58. Shaft 100 is provided with a bell crank 103 which has an extension 104 and a limit stop 105 adapted to abut bracket 102 (Figs. 2 and 5). The bell crank 103 is connected to rod 106 by means of a ball and socket joint 107 and the rod 106 is in turn pivoted to a rocker arm 108 by means of pin 109. Rocker arm 108 is journaled on shaft 110 which is mounted in one frame member 58 and bracket 111 (Fig. 2). A helical extension spring 112 connects pin 109 to the frame member 38 as shown in Fig. 4, and in the normal position is so adjusted to maintain the clamping feet 66 in the raised attitude of Fig. 2, in which position the limit stop 105 abuts bracket 102. Actuation of the rocker arm 108 is achieved by means of an adjustable stop 113 adapted to reciprocate up and down in a manner to be described more fully hereinafter.

When trap doors 55 are tilted as shown in Fig. 4, the doughnuts on each door fall into twelve individual chutes which are formed as two rows of dual chutes 115, 116, 117, 118, 119, and 120. These chutes are constructed to receive the doughnuts as they are tilted substantially 90° and to position them in two rows of six each so that pairs of doughnuts are axially positioned side by side and transversely positioned edge to edge. The upper configuration of the walls 121 forming the tops of the chutes is of importance and it will be noted that each inside chute wall is extended forward to dovetail in the U-shaped portion of the corresponding wall 42 of the channels (Fig. 12). In addition, the walls 121 are curved upwardly at a radius only slightly greater than the radius of the corners of the caps 61 with respect to the centerlines of shafts 56 of the trap doors, so that when the doors tilt, the corners of the caps have a close working clearance from the inner curved surface of the walls 121, thus avoiding any possibility that the objects could become jammed between the caps and the walls. The forward wall 122 of each chute is provided with a flat flange 123 which supports plate 50 together with the walls 42, 42 as shown in Fig. 12. However, it will be noted that plate 50 extends rearwardly over the flange 123 a sufficient distance to overhang the trap door 55 when in the raised position. This construction likewise insures freedom from jamming.

Furthermore, the walls 42 extend beyond plate 50 and form an extension of walls 60. The length of the trap doors 55 is such that two doughnuts of maximum diameter can be contained on the door with ample clearance for dropping the doughnuts into chutes 115–120. Likewise, the length of the doors must be such that under no circumstances would it be possible for three doughnuts of minimum diameter to become positioned on the door with sufficient clearance for all three to drop into the chute. In practice, we have found that the most desirable length for the doors should be approximately 2½ to 2¾ times the diameter of the average article (doughnut) when the doors operate for a pair of articles at a time. Then, even though the third doughnut should extend partially over the chute, it will be retained on plate 50 by means of the clamping feet 66 and the cutaway wall 60 will not then interfere with a partially overhanging doughnut. Nevertheless, the length of the cutaway together with the fact that the trap door base extends under plate 50, is ample to carry the second doughnut regardless of how small or how large it may be.

Referring now to Figs. 4 and 5, the doughnuts when dropped from doors 55 are caught by a pair of plates or trough forming members 125 and 126 which are pivotally attached to a vertically movable carriage 127 by means of pins 128, 128 (Fig. 22). When the plate members 125 and 126 are in position to receive a batch of doughnuts, they are tilted at an angle of approximately 45°, as shown in Fig. 5. The chutes 115—120 are separated transversely by means of a stationary partition 129 which substantially bisects the chutes so that as the doughnuts fall from tables 55, one doughnut from each door must drop on either side of the partition 129. In the position of Figs. 4 and 5, the doughnuts have been counted and collected preparatory to insertion in the cartons.

It will be understood that the dimensions of articles such as doughnuts vary within certain limits even though the batter from which the doughnuts are fried is closely controlled. Therefore the mechanism for handling the doughnuts or similar articles must be so constructed that there is no interruption or jamming, regardless of whether a succession of maximum sized articles occurs in the machine or whether a succession of minimum sized articles occurs in the machine. In the present instance, the clearances are sufficient to accommodate the largest possible doughnuts when received in pairs and at the same time the clearances eliminate the possibility that three doughnuts could be deposited in the chute at the same time, even though the three doughnuts were all of minimum dimensions. A similar problem is encountered in the compressing and filling parts of the mechanism since here again ample clearance must be provided to accommodate the largest possible doughnuts which might be handled.

The manner of handling the cartons and in positioning them to receive the dozen doughnuts shown in Fig. 4, will now be described. Fig. 14 shows the folded doughnut carton 135 as it is fed into the packaging machine. A supply of cartons 135 is stacked vertically in magazine 136 (Fig. 2) and may if desired, be compressed by weight 137. The bottom carton rests upon a plate 138 (Fig. 19) which is provided with a pair of ears 139, 139 on the top of plate 138 and near the forward corners thereof. The ears 139 assist in unfolding the carton 135, as will be described more fully hereinafter. The width of plate 138 is substantially less than the transverse dimension of carton 135 and the length is shorter than the longitudinal dimension of the carton. Plate 138 is however, attached to or formed integrally with a wider plate 140 in such a way that plate 140 overlaps plate 138 to form an abutment 141 of suitable height for removing a single folded carton from the stack in magazine 136. Plate 140 is integrally secured to a reciprocating carriage 142 mounted at one end on a rail 143 and at the opposite end in a groove 144 formed on frame member 145. Carriage 142 and plate 140 are adapted to reciprocate longitudinally of the machine to transfer a folded carton 135 from the bottom of magazine 136 to a station directly underneath the lower openings in chutes 115—120. Actuation of carriage 142 and plates 138 and 140 is achieved through a long pitman arm 146 pivoted to carriage 142 at 147 and to crank arm 148 at 149. Crank arm 148 is keyed to vertical shaft 150 which is driven through meshing bevel gears 151 and 152, the latter being mounted on horizontal shaft 153 which is mounted in bearings 154, 154, journaled to frame member 155. Shaft 153 also carries a sprocket 157 driven from sprocket 158 on shaft 82 by means of chain 159 (Fig. 6).

As carriage 142 is moved to the left (as seen in Fig. 16) on rail 143 and frame member 145, the bottom carton which is resting on plate 138 is ejected from underneath the stack of cartons in magazine 136 when the forward edge 141 of plate 140 engages the edge of the bottom carton. Cover plate 160 engages the folded sides of the carton as it is conveyed from beneath the magazine 136 to retain the folded sides in proper alignment to engage the box openers 161 and 162. As the carton is being transferred from the magazine 136, it is essential that proper alignment and engagement with the box openers 161 and 162 be accomplished. In the first place, the ears 139, 139 serve to partially unfold sides 135a and 135b so that these sides will be in the positions shown in Figs. 17 and 18. Frequently the sides of the cartons are pressed so tightly against the bottoms of the cartons that the sides will not naturally unfold when the pressure of the superimposed cartons is relieved. This slight upward curvature given to the bottom of the carton raises the sides 135a and 135b to the proper position for engagement with the openers 161 and 162. As the carton is farther advanced into the openers, it is also desirable that the leading edges of the openers clear the transverse edge 163 of side 135c of the carton. This result is accomplished by means of a spring finger 164 mounted on cover plate 160 in such a position that edge 163 will be depressed sufficiently to pass underneath openers 161 and 162 as the carton is advanced.

Further movement of the carriage 142 serves to position the box on the oppositely disposed box holders 165 and 166 which are formed from angular pieces having horizontal flanges 165a and 166a. The flanges 165a and 166a extend inwardly to support the edges of the cartons 135 in the clear space underneath the carton between the sides of plate 138 and the transverse edges of the cartons, as seen clearly in Figs. 16 and 20. Continued operation of the machine serves to pivot box openers 161 and 162 so that the sides 135a and 135b of the box are raised in the direction of the arrows shown in Fig. 20. The box openers are mounted on rods 167 and 168, journaled in frame member 58a, and retained therein axially by means of collars 169, 169. Shaft 168 extends through frame 58a and has attached thereto a bell crank 170 which carries a cam follower 171 operatively associated with cam 172. Shaft 167 is similarly journaled in frame 58a and carries a cam follower 173 which cooperates with cam 174. Cam 174 is mounted on shaft 82 which is driven by chain 81 and its associated sprockets; whereas cam 172 is mounted on shaft 175 which is driven by spur gear 176 meshing with spur gear 177 on shaft 82.

When the box 135 is moved to the opening station as described above, support for the box is transferred from plate 138 to the holders 165, 166 as shown clearly in Fig. 20. The holders 165, 166 are adapted to pivot outwardly to the position shown in Fig. 27, to permit the box when filled to drop vertically downward onto any convenient means for removing the filled cartons such as conveyer belt 180 mounted on roller 181 (Fig. 2). The box holders 165 and 166 are supported by and welded to shafts 182 and 183 respectively, which are in turn journaled in frame members 58a, 58a and retained axially therein by means of collars 184, 184 (Fig. 5). The shafts 182, 183 each carry crank arms 185, 186 which are operatively associated with cams 187, 188 through cam followers 189 and 190 (Fig. 6). Cams 187, 188 are mounted on shafts 82 and 175 respectively so that actuation of the box holders occurs in the proper timed relation with respect to the actuation of the other mechanism.

It will thus be understood that while the doughnuts or articles are being counted and collected in chutes 115—120 as described heretofore, the boxes are being positioned below the chutes, and the sides of the boxes opened so that the doughnuts may be injected into the boxes. Since the boxes are of a fixed dimension, it is desirable to squeeze the twelve doughnuts to such an extent that they fit the carton tightly.

Transfer of the doughnuts from the bottoms of the chutes to the cartons is achieved by means of carriage 127 and its associated mechanism which includes suitable devices for squeezing the doughnuts together so that they may be readily inserted in the cartons. The carriage 127 moves on vertical shafts 191 and 192 with an up and down reciprocating motion imparted to the carriage by a pair of modified Scotch yoke drives from shafts 82 and 175. Rollers 193, 193 are carried by crank arms 194, 194 keyed to the ends of shafts 82 and 175, which extend through journals 195, 195 mounted on side frame 58a (Figs. 5 and 6). The rollers 193, 193 oscillate in horizontal yokes 196, 196 which may be detachably mounted on the carriage 127 or formed integrally therewith.

A pair of movable lateral pressure plates 197, 198 are mounted on rods 199, 199 and 200, 200 respectively at each side of the carriage, and horizontal sliding action of the rods 199 and 200 with respect to carriage 127 is attained by means of a pair of cam rollers 201 and 202 supported on brackets 203 and 204 respectively, which are in turn attached to rods 199 and 200. The cam rollers 201, 202 run in vertical tracks 205, 206 in brackets 111, 208. The path of tracks 205, 206 is such that when carriage 127 is in the raised position, the plates 197, 198 are withdrawn outwardly as shown in Fig. 4; and as the carriage is lowered, the pressure plates are moved inwardly towards each other (as shown in the broken lines in Fig. 4) to receive and compress the doughnuts.

Referring now especially to Figs. 22–24, plates 125, 126 are attached by welding to a bracket member 210 having a pair of upwardly extending arms 210a and 210b in which are secured shafts 211, 211 by means of nuts 212, 212. A pressure foot 213 is mounted on cross plate 214 by means of bracket 215 and the foot assembly is slidable in a generally vertical direction on rods 211, 211. Plate 126 may be slotted along its upper edge at 216 and 217 to accommodate bracket 215 when in the extreme downward position. Plates 125 and 126 are mounted in the carriage for pivotal motion only with respect to the carriage. The angularity of this pivotal motion is controlled by means of a suitable linkage shown in Figs. 23 and 24 which comprises a pair of short links 218 and 219 pivotally connected to the back edges of plates 125 and 126 by means of pins 220 and 221 respectively. Links 218 and 219 are connected at their opposite ends by means of pin 222 which also extends through a slot 223 in stationary bracket 224. The position of links 218 and 219 when the carriage is in its uppermost limit of travel, is shown in Fig. 23. Links 218 and 219 are substantially horizontal and pin 222 is at the top of slot 223. This serves to tilt the plates 125 and 126 to provide in effect a trough having flat sloping sides. In the downward position, links 218 and 219 control the pivoting motion of plates 125 and 126 on pins 128 so that they are substantially vertical, as shown in Fig. 24. In this position, pin 222 is at the bottom of slot 223 and the bottom edges 125a and 126a of the plates have opened out the sides of carton 135.

The feet 213, 213' are actuated partially by pivotal movement of plates 125 and 126 with respect to the carriage 127 and the timing of the movement of feet 213 is achieved by means of rods 225 and 225' attached to the plates by means of knuckle joints 227 and 227' at their upper ends, and to crank arms 229 and 230 by means of knuckle joints 231 and 231' at their lower ends.

It will be understood that the structure described above in connection with plate 126 is identical with the opposite plate 125 and it is therefore believed unnecessary to repeat this description. However, the reference numerals associated with plate 125 are primed to correspond with the similar structure of the opposite plate.

Crank arms 229 and 230 are keyed to a horizontal shaft 233 journaled on the frame members 234, 234' at 235 and 236. Shaft 233 is retained axially by means of collars 237, 237 (Fig. 1). Shaft 233 extends beyond journal 235 and carries a pair of crank arms 238 and 239 which are adapted to follow cams 240 and 241 respectively through cam followers 242 and 243. This construction provides positive actuation of the presser feet 213, 213' through shaft 233 and the design of the cams 240 and 241 is such that the feet are positively depressed and raised by means of the cams. This avoids the use of any springs so that the mechanism cannot become jammed should a spring break.

Figure 28:
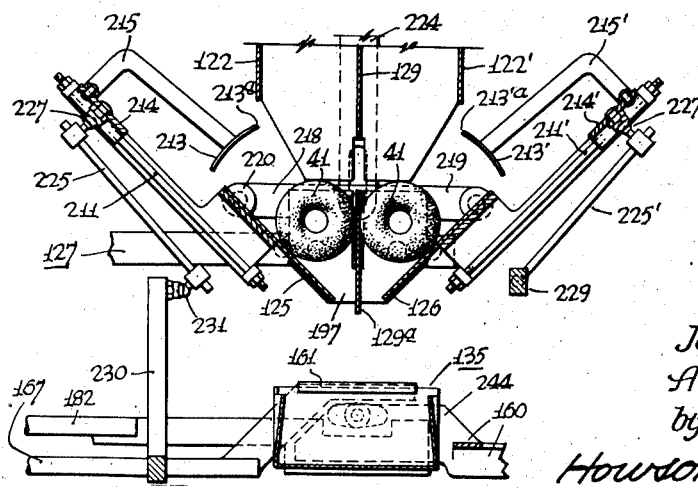
Fig. 28 is a fragmentary detail showing a portion of the structure of Fig. 5 in a slightly moved position.

In operation, the plates 125 and 126 begin to tilt from the trough position of Fig. 5 but at the same time carriage 127 is lowered so that the edges 213a and 213'a of feet 213, 213' just clear the sides 122, 122' of the chutes 115—120. Fig. 28 shows the carriage 127 in a further downward position and just before the rods 225 and 226 have begun to slide plates 214, 214' downwardly on shafts 211, 211'. Fig. 29 shows the mechanism of Fig. 28 in a still farther advanced position. Here the feet 213, 213' are about to engage the tops of the doughnuts, and plates 197, 198 have compressed the doughnuts sideways to the proper dimension for inserting them in the carton. In this connection, it will be noted in Fig. 29 that the plates 197, 198 are bifurcated to fit under the center partition 129a and extend upwardly on either side thereof. Fig. 25 schematically illustrates the above-described compression of the doughnuts and also shows that in addition to compressing the doughnuts themselves, it is necessary to move them to a position in which they press against each other after they have been dropped from the chutes.

Figs. 26 and 29 illustrate how the edges 125a, 126a of plates 125 and 126 engage the sides of the carton 135 and expand it so that the doughnuts may be dropped therein. In the position of Fig. 26, the doughnuts have been compressed to the proper dimension for insertion into the carton. At this point in the cycle, the feet 213, 213' are rapidly moved downwardly to engage the tops of the doughnuts and inject them into the carton. At the same time, the holders 165 and 166 are pivoted by means of their associated shafts 182, 183 so that continued downward movement of the feet 213, 213' serves to eject the filled carton completely from the machine onto the conveyor belt 180, whence they may be carried or transported to any convenient location for further wrapping, if desired.

The electrical system used for detecting any condition which should require the operator's attention, will now be described. There are three locations at which suitable detecting elements are located for the purpose of insuring proper functioning of the package handling system. The first location is adjacent to trap doors 55, and for this purpose the switches 63, 63 are placed in such a manner that each switch will be closed when the proper size or proper number of articles have been deposited on each trap door. The switches 63 are provided with horizontally extending arms 64 and abutments 65 which are so controlled in length that pressure against abutment 65 serves to close the switch 63.

The second station at which it is desirable to provide detector switches, is shown in Figs. 20, 26 and 27. It will be obvious that the machine must be stopped in the event that the cartons are not unfolded at both sides. Therefore, stationary plates 244 and 245 are provided with micro-switches 246, 246' which have actuating buttons 247, 247 extending horizontally towards the center of the box holding structure and located in such a position that the buttons will not contact the box openers 161 and 162 when they are raised, but will be actuated by the side of the box in the event that the side is properly engaged in each box opener. However, if for any reason one or both of the box openers does not unfold its associated side or does not unfold it sufficiently to actuate both buttons 247, 247 and thus close the micro-switches, the entire driving mechanism for the machine will be stopped in accordance with the operation of the wiring circuits, to be described more fully hereinafter.

The third station at which it is desirable to provide detector switches is seen in Figs. 31 and 32 which show a pair of detector switches 248, 249 (preferably of the micro-switch type) positioned in spaced relation with each other along conveyer 180. The arrangement of switches 248 and 249 is such that the spacing between the switches is more than the width of one carton of doughnuts but less than the width of two cartons, as shown in Fig. 32.

As the cartons travel on the belt 180, each carton successively opens the normally closed switches 248, 249. However, the spacing of the switches is such that they cannot both be opened at the same time by means of only one carton. In the event that the cartons back up on the belt to the switch station, two consecutive cartons touching each other will then contact both switches simultaneously to hold them both open. This condition will in turn shut down the motors before the filled cartons have an opportunity to back up to the loading mechanism and cause jamming.

Referring now to Fig. 31, the main switch 250 is connected to a source of power 251 by means of suitable lines, when switch 250 is closed, current flows through lines 252 and 253 to the main motor 74 and through normally closed solenoid switch 254. At a point on any part of the rotating mechanism just prior to tilting of trap doors 55, a testing switch 255 is located which is adapted to be closed by means of a suitable cam or lift on the rotating surface which in the present case may be bracket 256 on cam 241. As the doughnuts are fed onto trap doors 55, 55, it will be understood that the six detector switches 63, 63 will be closed when there are two doughnuts on each trap door. When the machine reaches the point in the cycle just before the time when the trap doors 55 are to open, cam 256 will open switch 255, which is a normally closed switch in a holding circuit, through lines 257, 258, solenoid 259, lines 260, 261, 262 and 263, back to line 264 from main switch 250. When switch 255 opens either one of two conditions may exist: first, in the event that the machine is operating properly, all switches 63 will be closed, whereupon solenoid 265 is energized to close both switches 266 and 267. When switch 267 closed, switch 268 will remain closed since solenoid 259 continues to be energized through lines 269 and 260 instead of lines 263, 262 and 261 when switch 255 is closed. It will thus be apparent that switch 268 is not opened even though switch 255 is opened, so long as all switches 63 are closed and consequently switch 267 is closed. The other condition occurs in the event that one or more switches 63 is open when switch 255 opens; then the current to solenoid 259 is cut, which permits switch 268 to open. When this occurs, the holding circuit to motor solenoid 270 is broken through lines 271, 272 and 272'. The opening of switch 254 automatically breaks the circuit to the main motor 74 in line 252 and at the same time applies brake 273 through de-energization of its associated holding solenoid 274. It will thus be understood that when switch 255 is opened at the proper time in each cycle, and before the trap doors 55 are to be dumped, only the motor 74 will be stopped in the event that all of the switches are not closed.

Solenoid 265 also operates switch 266 which is closed when the last switch 63 closes. The closing of switch 266 serves to energize solenoid 275 which controls clutch 68, thus disengaging the clutch and stopping the conveyer 35. Clutch 68 is spring-loaded and when no current flows through solenoid 275, the clutch is engaged, or in driving position with respect to motor 47. The purpose of this arrangement is to stop the conveyer automatically when all the trap doors 55 are filled and to prevent the conveyer from again moving until they are unloaded. It is especially important in handling fragile articles, such as doughnuts which may also be sugar coated, to avoid if possible any scraping or wiping of the articles on the conveyer belt which would occur in the event that the articles were unable to move ahead and the belt continued to run. Thus, as soon as the last trap door is filled, thereby closing its associated switch 63, the conveyer will stop through disengagement of clutch 68 by energization of solenoid 275 which in turn takes place through lines 276, normally closed jogging switch 277, line 278, and lines 279, 280 and 281 which connect to the main lines 257 and 264. However, in the event that testing switch 255 is opened and all switches 63 are not closed, motor 74 will stop as described above, but the conveyer 35 will continue to move due to the fact that solenoid 275 is not energized. This action permits more doughnuts to be fed onto the trap doors until they are all filled, whereupon the last switch 63 is closed, which in turn energizes solenoid 265 to restart motor 74 and continue the packaging operation without any danger of skipping a carton. Naturally, as soon as the trap doors are opened or tilted, the pressure is relieved from switches 63 so that they return to their normally open position which in turn opens switches 266 and 267 through de-energization of solenoid 265.

The detector switches 248 and 249 operate in conjunction with a testing switch 282 which is in all respects similar to switch 255 and located adjacent thereto (Fig. 1), and is also actuated by cam 256. Both switches 248 and 249 are normally closed, as shown in Fig. 32, and thus complete a holding circuit through lines 263, 262, 284, 285, 286, solenoid 287, line 288, and line 289 back to the main lines 257 and 264. This holding circuit retains switch 290 in normally closed position and switch 291 in a normally opened position by means of solenoid 287. Switch 290 is in series with switch 268 and must be closed in order to retain the motor solenoid 270 energized in a manner similar to that described in connection with switch 268. Switch 291 however, is in the conveyer circuit to clutch 68 and is normally open to keep conveyer clutch 68 engaged. Switches 248 and 249 are connected in parallel so that the circuit to solenoid 287 will not be broken as long as either one of the switches is closed. However, in the event that both switches are opened by reason of there being two adjacent boxes on the conveyer 180, then when switch 282 is opened by cam 256, solenoid 287 will be de-energized since all connections between line 286 and line 263 either through switch 248, switch 249, or switch 282, are broken. De-energization of solenoid 287 immediately opens switch 254 to stop motor 74 and to apply brake 273 through de-energization of solenoid 274. This also energizes solenoid 275 to disengage clutch 68 and stop conveyer 35.

The box opener detecting circuit comprises the two box opener detector switches 246, 246' which are connected in series with each other. The third testing switch 295 is located to be operated by a cam 296 mounted on cam 174 at a point such that cam 296 will open switch 295 immediately following the time when the box openers 161 and 162 have reached the point of maximum lift. In this position, both sides of the box, if properly opened, have actuated switches 246, 246' to close the circuit through lines 297, 298 and 299. Since switch 295 is connected in parallel with switches 246 and 246' through lines 300 and 301, it will be apparent that even though testing switch 295 is open, current will flow from line 297 through line 299 when both switches 246, 246' are closed. Line 299 is connected to solenoid 302 through a normally closed stop switch 303, switch 304, lines 305 and 306, and from thence back to line 289 through line 307, to complete the energizing circuit for solenoid 302. Thus it will be seen that so long as current flows through line 299, solenoid 302 will be energized to retain switch 304 closed, switch 308 closed and switch 309 open. Switch 308 is in series with switches 268 and 290 in the control circuit for motor 74, whereas switch 309 is in the conveyor circuit to solenoid 275. Thus it will be seen that with switch 308 closed and switch 309 open, motors 74 and 47 operate the apparatus as described above. However, in the event that either switch 246 or 246' is open when testing switch 295 is opened by cam 296, solenoid 302 will be de-energized to stop both motor 74 and conveyor 35 until such time as both sides of a carton are properly opened by the box openers and the starting switch 310 is momentarily closed manually.

Even though switch 250 is closed, the machine will not start until spring-loaded, normally open switch 310 is momentarily closed. This closing of switch 310 permits energization of solenoid 302 through lines 306, 311, 312, 299, 301, switch 295, and lines 300 and 263 unless, of course, the machine is stopped with cam 296 holding switch 295 open. As soon as solenoid 302 is energized by starting switch 310, switch 304 is closed to complete the circuit when switch 310 is open. Stop switch 303 is so located that if open, both motor 74 and conveyor 35 will be stopped, as previously described.

The various testing and detector switches may be by-passed by means of jogging switch 277 so that both the conveyor and the motor 74 may be operated regardless of the position of cams 256 and 296. Jogging switch 277 is connected to solenoid 275 through line 278 and to solenoid 270 through line 313.

It will be understood that the present embodiment of our apparatus is primarily adapted to fill cartons with objects such as doughnuts in two rows of six doughnuts each. However, it will be apparent that many variations of the exact structure may be made in order to handle a wide variety of articles. It is contemplated that the machine will be useful in handling many bakery and food products such as rolls, buns, cookies, and crackers. Furthermore, it will find application in filling large containers with smaller packages of products, for example, crackers, which customarily are wrapped in square boxes containing approximately half a dozen crackers. It will be understood that the machine can be readily used to handle many items other than food products. These may be collected and counted by means of the conveyor and trap door mechanism without actually being packaged in any way. The size and shape of container contemplated is in no way limited to the particular carton shown. A boat, box, or any type of container may be used.

It is also entirely possible to vary both the number of articles that are simultaneously packaged and the manner in which they may be inserted into any suitable container. There may be a single row comprising any desired number of articles, or two or more rows of 2, 4, 5, 6 etc. articles in each row. An illustration of only one modification of the machine that may be readily made, is shown in Fig. 30. In this embodiment, chute 340 has been narrowed to eliminate the central transverse partition 129 and the chute may be provided with sides 341 and 342 having any transverse or longitudinal spacing that may be desired. In the event that rows of articles 343 are to be handled, longitudinal partitions 344 may be provided. The other mechanism for counting and depositing articles 343 in chute 340 may be identical with that previously described. Likewise, the actuation and operation of plates 125 and 126 in this case will be identical as will also be the actuation and operation of the single foot 213. Advancing end wall 65, together with concurrent cutting away of top 61 and side 60, will permit the use of a modified trap door structure such as 55'. Alternatively, the entire trap door 55' may be shortened. It will be understood that the dimensions and number of chutes may thus be varied over a wide range in order to accommodate the specific articles to be handled.

Having thus described our invention,

We claim:

1. In article handling machinery, a frame, a plurality of doors mounted on said frame, said doors being arranged in spaced relation to each other and adapted to swing from a normally horizontal position, means for supplying articles to said doors when horizontally disposed, a chute associated with each door and adapted to receive one or more articles from the doors and to retain said articles in an upended position, a retaining member spaced from each door and secured thereto, said doors being positioned to receive the articles between the door and the retaining member for positively turning the articles received by the doors from a horizontal position to a vertical position as the doors and articles swing through an arc of substantially 90°, means for swinging said doors, and means at the bottoms of said chutes for collectively removing the upended articles therefrom.

2. In article handling machinery, a frame, a plurality of doors mounted on said frame, said doors being arranged in spaced relation to each other and adapted to swing from a horizontal position, a side for each door, a top for each door, said top extending in vertical spaced relation to the upper surface of each door and substantially parallel thereto, means for supplying articles to said doors when horizontally disposed, a chute associated with each door and adapted to receive one or more articles from the doors and to retain said articles in an upended position, means for swinging said doors, and means at the bottoms of said chutes for collectively removing the articles therefrom.

3. In article handling machinery, a frame, a plurality of doors mounted on said frame, said doors being arranged in spaced relation to each other and adapted to swing from a horizontal position, a side for each door, a top for each door, said top extending in vertical spaced relation to the upper surface of each door and substantially parallel thereto, an upwardly flaring front on said top portion, a chute associated with each door and adapted to receive one or more articles from the doors and to retain said articles in an upended position, a side for each of said chutes extending above the top of the chute and in spaced relation to the door and top thereof to form a compartment in association with each door structure, said chute side being arcuately formed in proportion to the swinging radius of the door and top thereof, means for swinging said doors, aand means at the bottoms of said chutes for collectively removing the articles therefrom.

4. In article handling machinery, a frame, a plurality of doors mounted on said frame, said doors being arranged in spaced relation to each other and adapted to swing from a normally horizontal position, means for supplying articles to said doors when horizontally disposed, said means terminating at a forward edge of each door, a clamping member positioned over the article supplying means at the terminus thereof, said clamping member being adapted to momentarily retain an article from being dropped by the doors, and means for actuating said clamping members in timed relation to the swinging of the doors.

5. In article handling machinery, a frame, a plurality of doors mounted on said frame, said doors being arranged in spaced relation to each other and adapted to swing from a horizontal position, a side formed integrally with each door, a top formed integrally with said side and extending in vertical spaced relation to the upper surface of each door and substantially parallel thereto, a conveyer for supplying articles to said doors, the top surface of the conveyer being in substantial registry with the top surface of each door, a plurality of wall members supported over said conveyer for guiding articles onto the doors, means for supporting the wall members at a point near the terminus of the conveyer, means for movably supporting the walls at their opposite ends, and means for vibrating said wall members transversely of the conveyer.

6. In article handling machinery, a frame, a plurality of doors mounted on said frame, said doors being arranged in spaced relation to each other and adapted to swing from a horizontal position, a side formed integrally with each door, a top formed integrally with said side and extending in vertical spaced relation to the upper surface of each door and substantially parallel thereto, a chute associated with each door and adapted to receive a pair of articles from each door, a partition in each chute adapted to separate the articles when the doors are swung downwardly, a side for each of said chutes extending above the top of the chute and in spaced relation to the door and top thereof and forming a compartment in association with each door structure, and means for swinging the doors to deposit an article in each chute section.

7. In article handling machinery, a frame, a plurality of substantially vertical chutes mounted in said frame, means for depositing a predetermined number of articles in said chutes, a pair of horizontally pivoted plates adapted to form a trough at the bottoms of said chutes and to receive articles passing through the chutes, said plates being positioned at opposite sides of the articles, and means for pivoting said plates inwardly toward each other to a substantially vertical position and against opposite sides of the articles, to compress said articles against each other.

8. In article handling machinery, a frame, a plurality of substantially vertical chutes mounted in said frame, means for depositing a predetermined number of articles in said chutes, a pair of horizontally pivoted plates adapted to form a trough at the bottoms of said chutes and to receive articles passing through the chutes, said plates being positioned at opposite sides of the articles, means for pivoting said plates inwardly toward each other to a substantially vertical position and against opposite sides of the articles, to compress said articles against each other, and pusher means mounted for pivotal movement with said plates and relative thereto into engagement with the articles for ejecting the articles downwardly from between the plates.

9. In article handling machinery, a plurality of substantially vertical chutes adapted to receive articles deposited simultaneously therein, trough means associated with the bottoms of said chutes for retaining a predetermined number of articles therein and in spaced relation with each other, a carriage operatively connected to said trough means adapted to reciprocate vertically with respect to the bottoms of said chutes, and means operated by vertical movement of said carriage for opening the trough means.

10. In article handling machinery, a frame, a plurality of substantially vertical chutes mounted in said frame, means for depositing a predetermined number of articles in said chutes, a pair of horizontally pivoted plates adapted to form an article receiving trough at the bottoms of said chutes, means for pivoting said plates to compress said articles against each other transversely, means for compressing said articles against each other longitudinally, and means for ejecting the articles downwardly from between both said compressing means.

11. In article handling machinery, a frame, a plurality of substantially vertical chutes mounted in said frame, means for depositing a predetermined number of articles in said chutes, a carriage supported on said frame and adapted to reciprocate vertically with respect to the bottoms of said chutes, a pair of horizontally movable pressure plates mounted on said carriage, a cam track mounted in the frame, a cam follower cooperating with the cam track and adapted to move at least one of said pressure plates horizontally when the carriage is actuated vertically, a pair of pivoting plates mounted on said carriage, said pivoting plates positioned substantially at right angles to the pressure plates, and means including a link for pivoting said plates on the carriage during vertical movement thereof whereby articles received from the chutes are initially retained by the pivoting plates and subsequently compressed between said pivoting plates and the pressure plates as the carriage reciprocates vertically.

12. In article handling machinery, a frame, a plurality of substantially vertical chutes mounted in said frame, means for depositing a predetermined number of articles in said chutes, a carriage supported on said frame and adapted to reciprocate vertically with respect to the bottoms of said chutes, a pair of horizontally movable pressure plates mounted on said carriage, a cam track mounted in the frame, a cam follower cooperating with the cam track and adapted to move at least one of said pressure plates horizontally when the carriage is actuated vertically, a pair of pivoting plates mounted on said carriage, said pivoting plates being positioned substantially at right angles to the pressure plates, and link means connecting the pivoting plates to the frame whereby said pivoting plates are actuated with respect to the carriage when the carriage moves vertically.

13. In article handling machinery, a plurality of substantially vertical chutes adapted to receive articles deposited therein, a carriage adapted to reciprocate vertically with respect to the bottoms of said chutes, a pair of oppositely disposed plates pivotally mounted on the carriage and forming a trough to receive articles from the chutes, a pusher member slidably mounted on each of said plates, means for moving the carriage vertically with respect to the bottoms of said chutes, means for pivoting the plates on the carriage, and means for sliding the pusher members with respect to their associated plates, whereby articles deposited in the plates are ejected downwardly from between the plates in timed relation to the downward movement of the carriage.

14. In article handling machinery, a frame, a plurality of door members mounted on said frame, said doors being arranged in spaced relation to each other and adapted to swing from a horizontal position, conveyer means for supplying articles to said doors, a motor for actuating said conveyer means, a clutch connecting said motor and the conveyer, a solenoid for engaging and disengaging said clutch, motor means for swinging said doors, switch means mounted on the frame in spaced relation with each door and opposite the conveyer means, circuit means connecting the switch means with the clutch solenoid and with the door motor, a testing switch in said circuit means, the testing switch being connected in parallel with all of the door switches so that if any door switch is open at the same time the testing switch is open, the door motor will stop but the clutch will remain engaged to operate the conveyer to feed additional articles onto the doors.

JOHN P. MURDOCH.
ALBERT J. FAULHABER.

References Cited in the file of this patent

UNITED STATES PATENTS

| Number | Name | Date |
|---|---|---|
| 1,045,391 | Graf | Nov. 26, 1912 |
| 1,090,855 | Jagenberg | Mar. 24, 1914 |
| 1,559,707 | Jones | Nov. 3, 1925 |
| 1,568,082 | Mitton | Jan. 5, 1926 |
| 1,592,794 | Webster | July 13, 1926 |
| 1,611,822 | Dulche | Dec. 21, 1926 |
| 1,739,619 | Smith et al. | Dec. 17, 1929 |
| 1,743,780 | Hurlburt | Jan. 14, 1930 |
| 1,893,455 | Stone | Jan. 3, 1933 |
| 2,050,547 | Thayer | Aug. 11, 1936 |
| 2,179,648 | Thayer | Nov. 14, 1939 |
| 2,296,802 | Thompson | Sept. 22, 1942 |
| 2,307,510 | Johnsen | Jan. 5, 1943 |
| 2,382,729 | Kurzbin | Aug. 14, 1945 |
| 2,400,484 | Campana | May 21, 1946 |
| 2,464,407 | Levkoff | Mar. 15, 1949 |
| 2,510,343 | Krause et al. | June 6, 1950 |